United States Patent [19]
Hammond

[11] 3,765,711
[45] Oct. 16, 1973

[54] AUTOMATICALLY UNLOADING CARGO ENCLOSURE

[75] Inventor: Daniel D. Hammond, Marana, Ariz.

[73] Assignee: Intermountain Aviation, Inc., Marana, Ariz.

[22] Filed: Nov. 17, 1972

[21] Appl. No.: 307,488

[52] U.S. Cl. .................................. 294/77, 294/76
[51] Int. Cl. .............................................. B66c 1/12
[58] Field of Search ................... 294/67 E, 74, 75, 294/76, 77, 83 R, 83 A; 244/137 R

[56] References Cited
UNITED STATES PATENTS

| | | | |
|---|---|---|---|
| 835,038 | 11/1906 | Simpson | 294/76 |
| 3,101,213 | 8/1963 | Elsner | 294/83 R |
| 1,932,527 | 10/1933 | Long | 294/77 X |
| 3,120,975 | 2/1964 | Tillman | 294/69 |

Primary Examiner—Evon C. Blunk
Assistant Examiner—Johnny D. Cherry
Attorney—William H. Drummond

[57] ABSTRACT

A novel cargo enclosure is adapted to contain and support a cargo while suspended above the ground and is further adapted to automatically unload the cargo when the cargo enclosure is lowered to the ground. In the preferred embodiment, a continuous net forms the side walls and floor of the enclosure. Vertical members of the net terminate with connector links which are normally held together by a latch mechanism. A ground-contact sensor automatically releases the latch mechanism when the cargo enclosure is lowered to the ground, allowing the bottom of the net to open and permitting gravity discharge of the cargo onto the ground.

1 Claim, 8 Drawing Figures

Patented Oct. 16, 1973

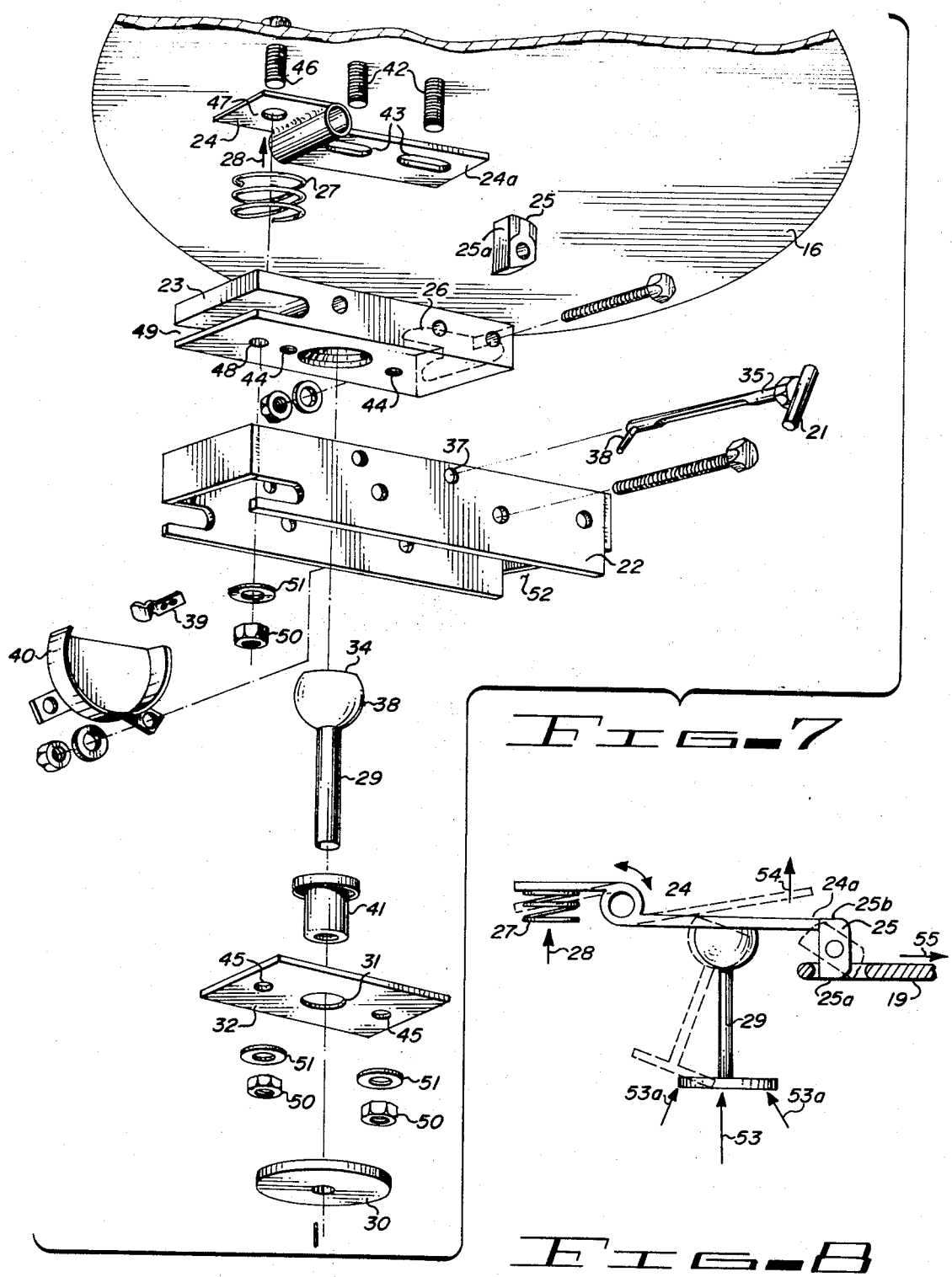

AUTOMATICALLY UNLOADING CARGO ENCLOSURE

This invention relates to cargo enclosures.

More particularly, the invention concerns a cargo enclosure adapted to contain and support a cargo while suspended above the ground and adapted to automatically unload the cargo when the cargo enclosure is lowered to the ground.

In a further and more specific respect, the invention concerns a cargo net especially adapted for use in helicopter aerial supply operations and in unloading cargo from large cargo transporters such as barges, ships, railroad gondola cars, etc., by means of an overhead crane.

In helicopter aerial supply operations, it is common to carry the cargo to the unloading zone in a large net suspended on a winch line under the helicopter. When the helicopter reaches the unloading zone, which may be in mountainous or heavily forested terrain, the cargo net is lowered to the ground by unreeling the winch line while the helicopter remains airborne. The cargo net is disconnected from the winch line and ground personnel then unload the cargo. Unless the helicopter remains in the vicinity of the unloading zone while the cargo is unloaded from the net, it must return to the cargo supply point, leaving the net at the unloading zone. Further supply operations may be hampered by a shortage of nets at the supply point and nets left at the unloading zone may not be recovered for a considerable period of time, or may even be destroyed or damaged. Finally, in some instances, ground personnel may not be available to unload the cargo net and re-attach it to the helicopter winch line even if the helicopter is able to stay in the vicinity of the unloading zone while the cargo is unloaded from the net.

Some of the disadvantages mentioned above are also encountered in unloading large cargo transporters such as barges, ships, railroad gondola cars, etc. Conventional cargo nets require dock or railside ground workers for unloading the nets after the cargo has been removed from the transporter and lowered to the ground. A large number of nets are required so that the unloading crane can be making a return trip to the transporter while the previously deposited net is being unloaded by the ground workers.

It would therefore be highly advantageous to provide a cargo enclosure especially adapted to contain and support the cargo while suspended above the ground and further adapted to automatically unload the cargo when the enclosure is lowered to the ground, thus making it possible to reuse the cargo enclosure an indefinite number of times without disconnecting it from a suspension cable and without requiring the immediate presence of ground personnel to unload the cargo.

Thus, it is an object of the present invention to provide an improved cargo enclosure.

Another object of the invention is to provide a cargo enclosure especially adapted for use in helicopter aerial supply operations.

Still another object of the invention is to provide an improved cargo enclosure for use in unloading large cargo transporters such as barges, ships, railroad gondola cars, etc.

Still another and further object of the invention is to provide an improved cargo enclosure especially adapted to contain and support a cargo while suspended above the ground and adapted to automatically unload the cargo when the cargo enclosure is lowered to the ground, thereby reducing the number of such enclosures required for a given aerial supply or unloading operation while reducing the number of ground personnel required to handle the cargo.

Yet another object of the invention is to provide an improved cargo enclosure especially useful in military aerial supply operations which can be unloaded very quickly without exposing ground personnel to enemy action.

These and other, further and more specific objects and advantages of the invention will be apparent to those skilled in the art from the following detailed description thereof taken in conjunction with the drawings, in which:

FIG. 7 is an exploded perspective view of the presently preferred embodiment of the latch mechanism; and FIG. 8 is a cut-away perspective view of the assembled components of FIG. 7 with certain of the elements omitted for clarity of illustration.

Figure 1:
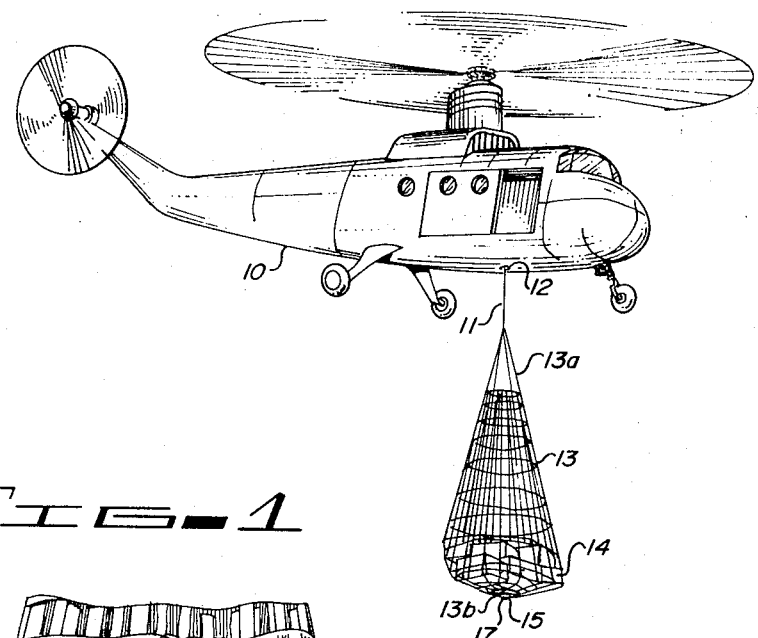
FIG. 1 is a perspective view of the presently preferred embodiment of the cargo enclosure suspended beneath a typical aerial supply helicopter.

Briefly, in accordance with the invention, I provide a cargo enclosure adapted to contain and support a cargo while suspended above the ground and adapted to automatically unload the cargo when the enclosure is lowered to the ground. The novel cargo enclosure comprises in combination means, including a normally closed releasable portion, defining the side walls and floor for the enclosure; latch means for maintaining the releasable portion in closed position; a ground-contact sensor; and means responsive to the sensor for automatically releasing the latch means to open the releasable portion of the enclosure, thus permitting gravity discharge of the cargo therefrom when the sensor makes ground contact.

In the drawings, the presently preferred embodiment of the invention is depicted for illustrative purposes and like reference characters identify the same parts in the several views.

FIG. 1 illustrates a typical helicopter 10 having a power winch apparatus. The winch line 11 operates through an aperture 12 in the floor of the helicopter 10. The upper ends 13a of vertical members of a cargo net 13 are secured to the lower end of the winch line 11. The cargo 14 is enclosed within and supported by the net 13. Lower ends 13b of vertical members of the cargo net 13 are secured together by a latch mechanism 15.

Figure 2:
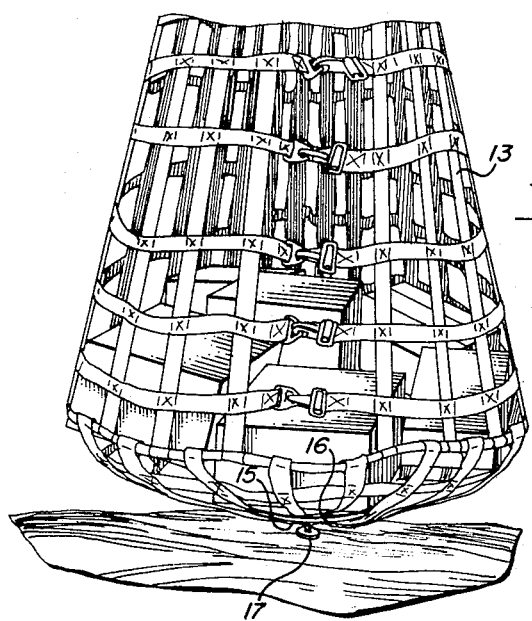
FIG. 2 is a view showing the enclosure of FIG. 1 at the point of first contact with the ground.
Figure 3:
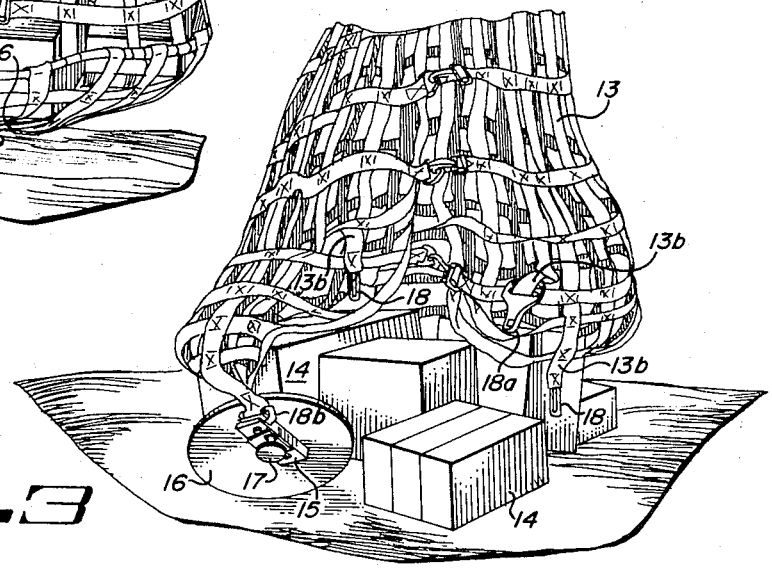
FIG. 3 is a view of the cargo enclosure of FIGS. 1-2 after ground contact and after the enclosure has been automatically unloaded.

As shown in FIGS. 2-3, the latch mechanism 15 is carried on a plate member 16. A ground-contact sensor 17 extends below the plate 16 and latch mechanism 15. When the cargo net 13 is lowered to the ground, as shown in FIG. 2, the ground-contact sensor 17, being lowermost, contacts the ground first, tripping the latch mechanism 15 and releasing the links 18 and 18a which secure the lower ends 13b of vertical members of the cargo net 13 together and allowing the cargo 14 to be discharged onto the ground.

Figure 4:
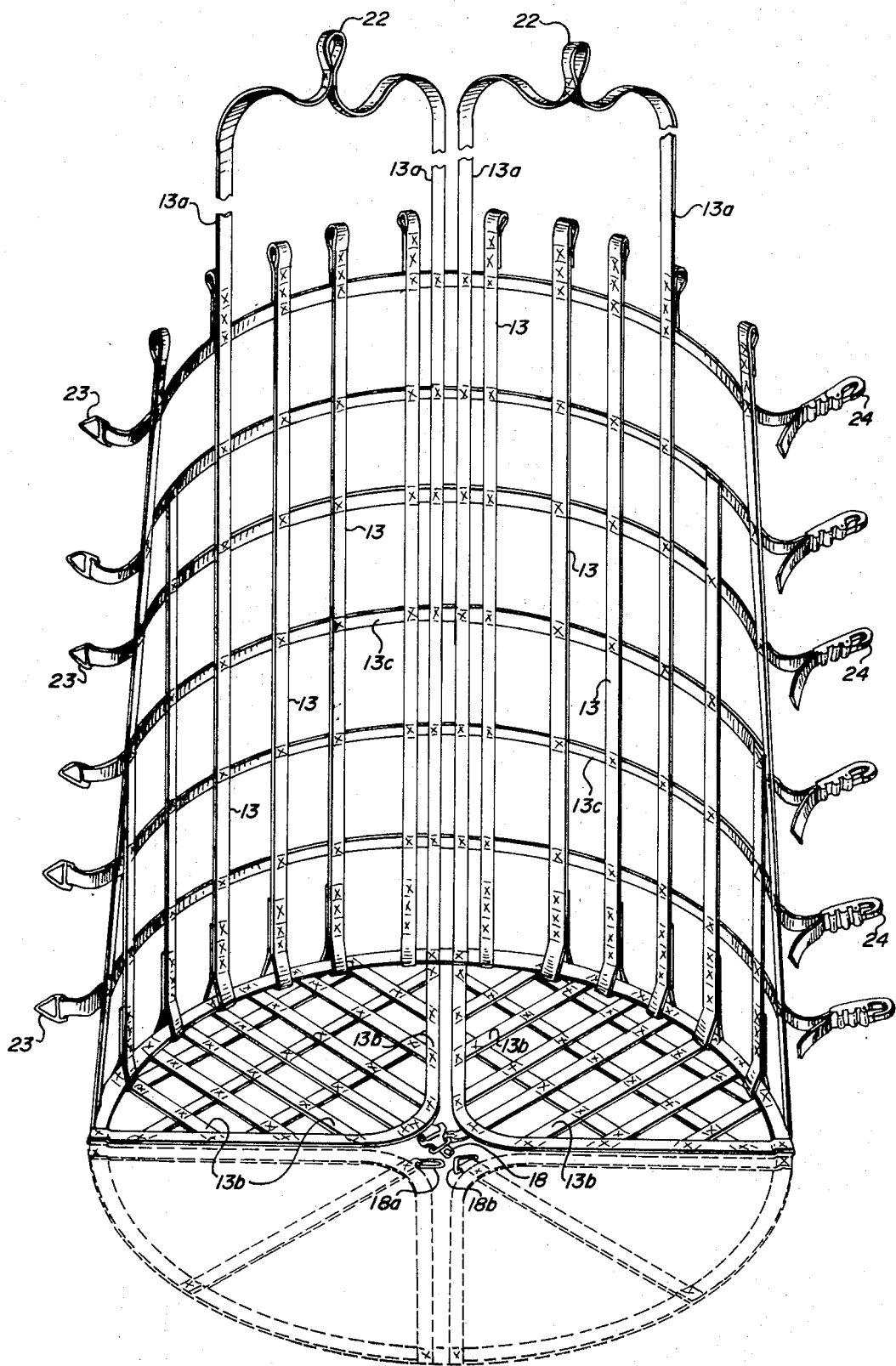
FIG. 4 is a perspective view of a portion of a cargo net constituting the presently preferred embodiment of the invention with the remainder of the net and the latch mechanism — ground contact sensor assembly omitted for clarity of illustration.

The construction and mode of operation of the preferred embodiment of the invention are further illustrated in FIG. 4, which depicts half of the cargo net. The lower portion of the other half of the cargo net is shown by the dashed lines. As shown in FIG. 4, the net consists of a plurality of vertical web members 13 and stringers 13c sewn together to form the net. The upper ends 13a of spaced vertical members 13 terminate in loops 22 adapted for attachment to the lower end of a winch or crane cable. The ends of the stringers 13c are provided with D-rings 23 and snap-fasteners 24 for attachment to the snap-fasteners and D-rings on the other half of the net (omitted). Lower ends 13b of the vertical members 13 are attached to links 18a and 18b which, when held in the position shown in FIG. 4, form a closure for the bottom of the net. The apparatus for holding the links 18, 18a and 18b in the closed position is illustrated in FIGS. 5-6.

Figure 5:
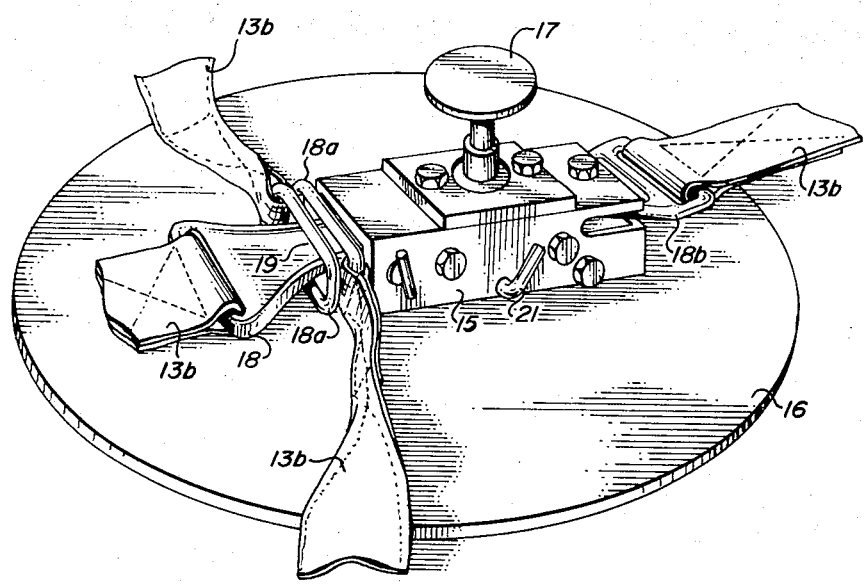
FIG. 5 is a perspective view of the bottom of the latch mechanism — ground contact sensor assembly showing the ends of vertical members of the cargo net linked and held together by the latch mechanism.
Figure 6:
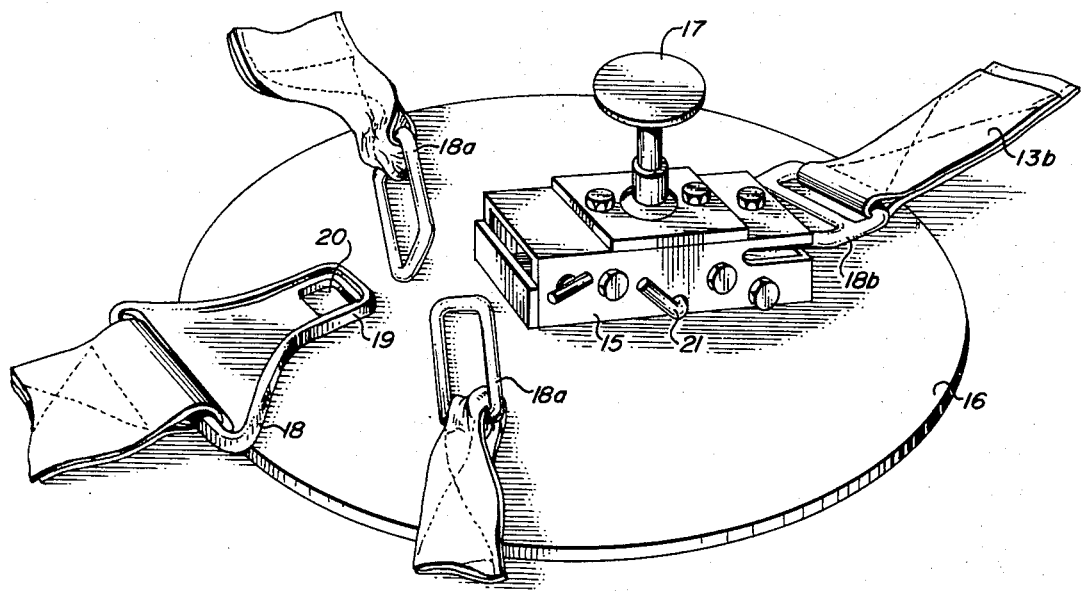
FIG. 6 is a perspective view of the apparatus of FIG. 5 after the ground-contact sensor has released the latch mechanism, freeing the cargo net links.

The operation of the ground sensor — latch mechanism is further illustrated in FIGS. 5-6, which are bottom views of the mechanism before and after ground contact. The latch mechanism 15 is carried on the bottom of the plate member 16. The ground-contact sensor 17 is operatively associated with the latch mechanism 15 in such manner as to release the latch when ground contact is made. Suitable links 18, 18a and 18b are attached to the lower ends 13b of strap members forming the cargo net. The links 18 and 18a are the same as the links found in safety belt installations in race cars and aircraft. The link 18 has a forwardly extending tongue 19 provided with an aperture 20. The tongue 19 is inserted through the O-shaped links 18a and extends into the latch mechanism housing 15. The entire assembly of the plate 16, latch mechanism 15 and ground-contact sensor 17 is permanently attached to the cargo chute by means of a D-ring 18b. A handle 21 operates a safety device within the latch mechanism housing 15. The safety device (shown in FIGS. 7-8) prevents accidental release of the latch mechanism while the cargo is loaded into the net 13. The handle 21 is maintained in the "sae" position (as shown in FIG. 5) until the net and cargo are first raised above the ground. Then the safety handle 21 is turned to the position shown in FIG. 6 such that upon first ground contact, the sensor 17 will trigger the latch mechanism, releasing the tongue 19 and allowing the links 18 and 18a to separate to discharge the cargo.

The details of construction and mode of operation of the latch mechanism and ground-contact sensor are depicted in FIGS. 7-8. The latch mechanism consists of a body member 22 which encloses a frame member 23. A trip lever 24 is located in the body 22 above the frame 23. A retainer finger 25 operates in a slot 26 (indicated by dashed lines) in the frame 23. The inner face 25a of the retainer finger bears against the right-hand edge 24a of the trip lever 24. A spring 27 urges the lefthand side of the trip lever upwardly in the direction of the arrow 28. The ground-contact sensor comprises an elongate shaft 29 having a plate member 30 affixed to the lower end thereof. The shaft 29 is positioned in an aperture 31 in a cover plate 32. The upper portion of the shaft 29 is formed into a ball 33 having a flattened upper surface 34. The safety lock comprises a pin 35 a portion of which is milled away to provide a reduced diameter portion 36. The safety handle 21 is affixed to one end of the pin 35. The pin extends through apertures 37 in the body member 22 and is retained therein by means of a pin 38. A safety lock spring 39 mounted on the opposite side of the body 22 provides a detent to position the pin 38 and locate the rotational position of the flattened pin 35. A cover 40 is affixed to the opposite side of the body 22 to enclose the safety lock spring 39 and the pin 38. The sensor shaft 29 is free to move upwardly or to be deflected angularly within a rubber seal bushing 41. The latch assembly and ground-contact sensor are affixed to the plate 16 by means of bolts 42 extending through enlarged holes 43 in the trip lever 24, through holes 44 in the frame 23, and through holes 45 in the retainer plate 32. A bolt 46 extending through the plate 16, through an enlarged hole 47 in the trip lever, and through a hole 48 in the frame 23 secures the permanent connector link attached to the cargo harness in the slot 49. Suitable nuts 50 and lock washers 51 are provided for the bolts 42 and 46.

The operation of the apparatus of FIG. 7 is schematically illustrated in FIG. 8. The tongue 19 of the connector link 18 (FIGS. 1-6) is inserted through a slot 52 formed in the lower portion of one end of the body member 22. The lower edge 25a of the retainer finger 25 engages the slot in the extremity of the tongue 19. The retainer finger 25 is maintained in the vertical position shown in FIG. 8 as the upper end 25b thereof bears against the edge 24a of the trip lever 24. The spring 27 normally urges the left-hand end of the trip lever 24 upwardly in the direction of the arrow 28. Ground impact force in a vertical direction, as indicated by the arrow 53, would force the sensor shaft 29 vertically upwardly. Impact at an angle would tend to force the shaft 29 upwardly and also to tilt the shaft 29 as indicated by the dashed lines. In either event, the right-hand edge 24a is forced upwardly in the direction of the arrow 54 out of engagement with the upper edge 25b of the retainer finger 25. The weight of the cargo in the sling pulls in the direction of the arrow 55 on the tongue 19. Since the upper edge 25b of the retainer finger is no longer in contact with the edge 24a of the trip lever 24, the retainer finger 25 can rotate in the direction of the arrow 55 out of engagement in the slot of the tongue member 19. The tongue member 19 is thereby released, and the links 18, 18a and 18b are free to separate, discharging the cargo in the enclosure onto the ground as shown in FIG. 3.

Having described my invention in such full, clear and concise terms as to enable those skilled in the art to understand and practice the invention, and having identified the presently preferred embodiment thereof,

I claim:

1. A cargo enclosure adapted to contain and support a cargo while suspended above the ground and adapted to automatically unload the cargo when the cargo enclosure is lowered to the ground, said cargo enclosure comprising, in combination:
- a. means, including a normally closed releasable portion, defining the side walls and floor for said enclosure;
- b. latch means for maintaining said releasable portion in closed position;
- c. a ground-contact sensor; and
- d. means responsive to said sensor for automatically releasing said latch means to open said releasable portion of said enclosure to permit gravity discharge of the cargo therefrom when said sensor makes ground contact.

* * * * *